July 30, 1963 L. BODDY 3,099,731
ELECTRICAL CONTROL APPARATUS
Original Filed Sept. 23, 1955 4 Sheets-Sheet 1

INVENTOR.
Leonard Boddy
BY
Harness, Dickey & Pierce
ATTORNEYS.

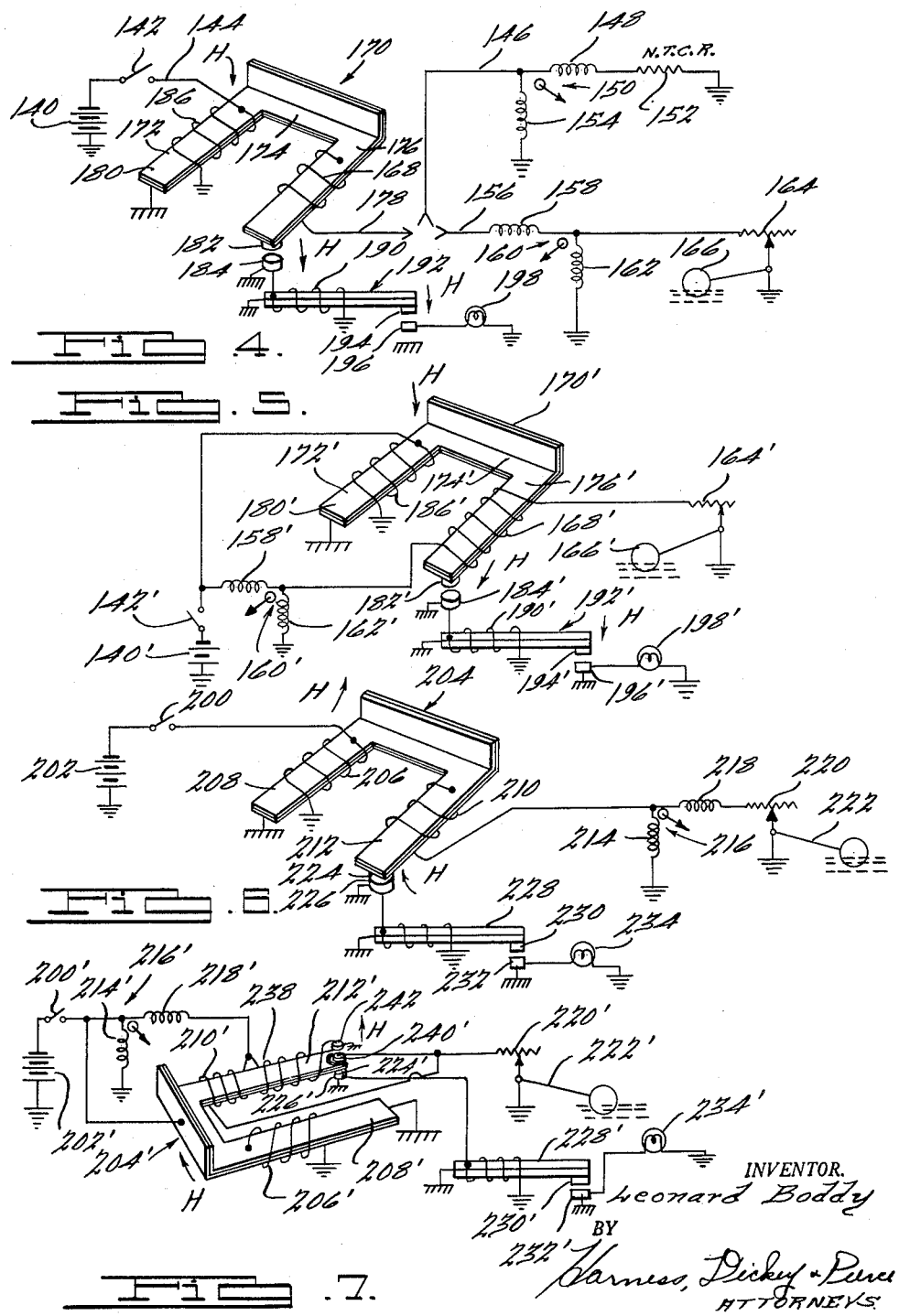

July 30, 1963 L. BODDY 3,099,731
ELECTRICAL CONTROL APPARATUS
Original Filed Sept. 23, 1955 4 Sheets-Sheet 3
FIG. 9.
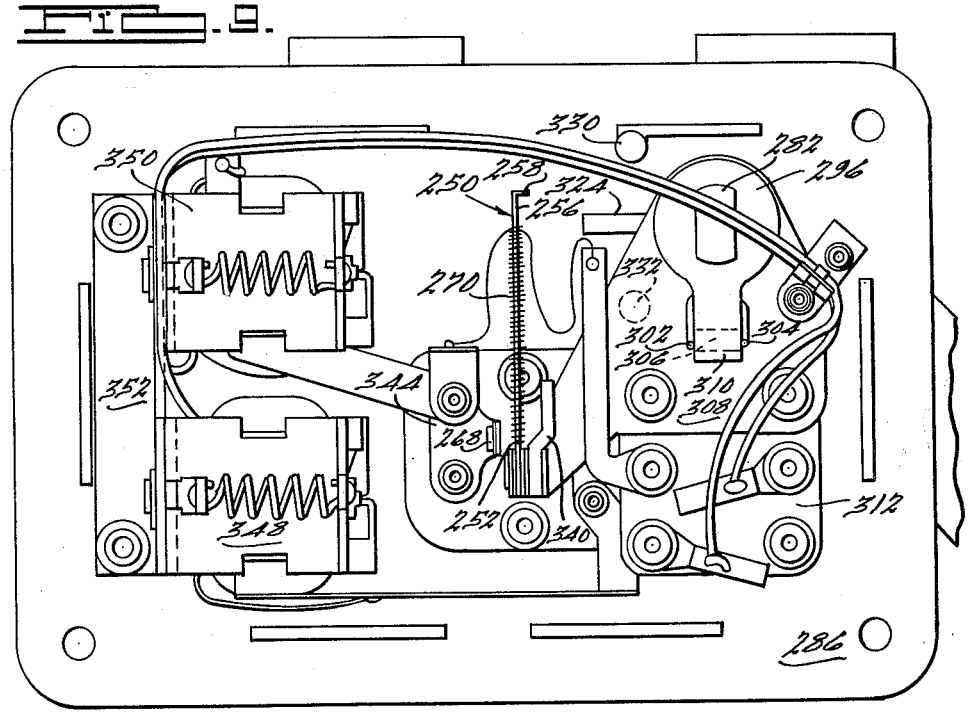
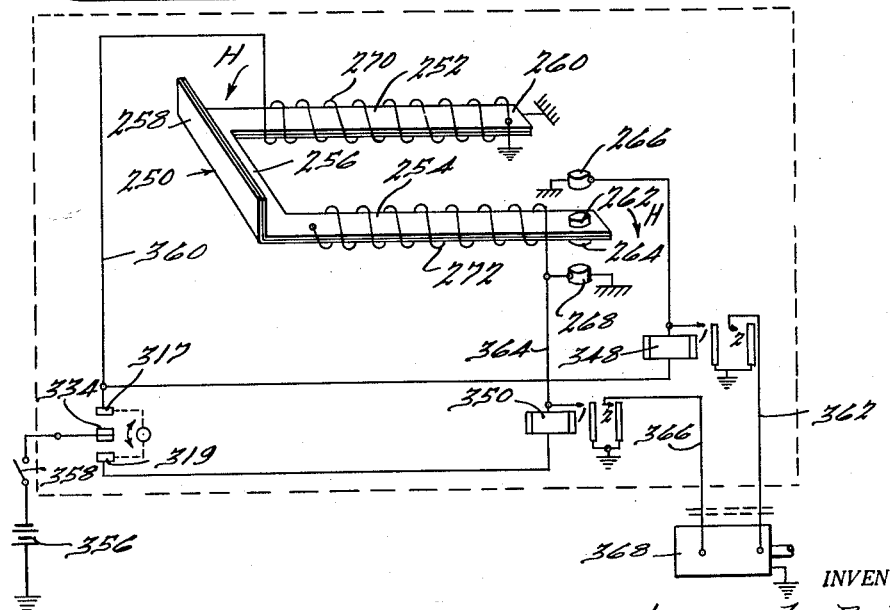
FIG. 8.
INVENTOR.
Leonard Boddy
BY
Harness, Dickey & Pierce
ATTORNEYS

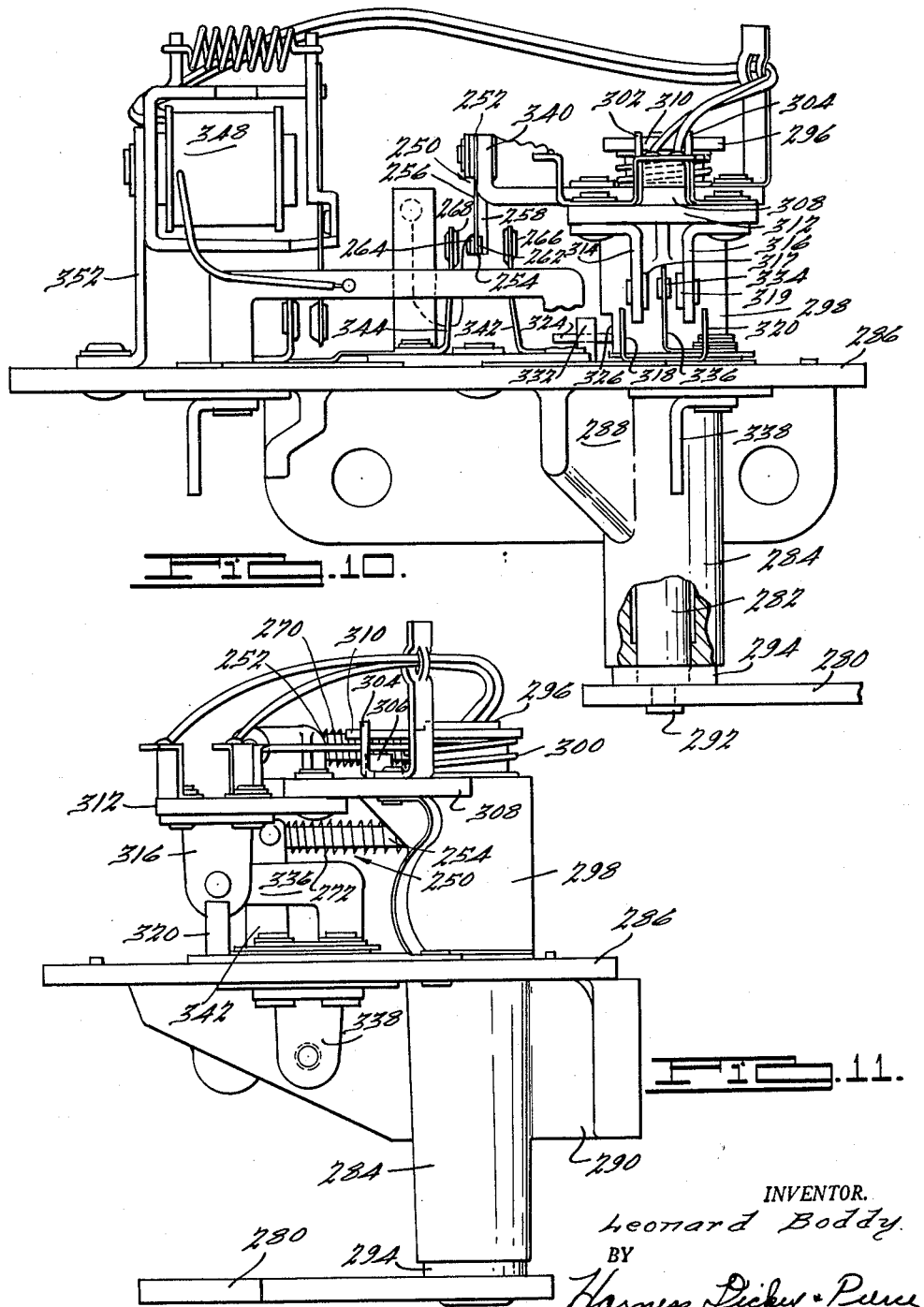

United States Patent Office 3,099,731
Patented July 30, 1963

3,099,731
ELECTRICAL CONTROL APPARATUS
Leonard Boddy, Ann Arbor, Mich., assignor to King-Seeley Thermos Co., a corporation of Michigan
Original application Sept. 23, 1955, Ser. No. 536,160. Divided and this application Nov. 3, 1960, Ser. No. 72,265
13 Claims. (Cl. 200—122)

This invention relates to signaling and control devices, and to signaling and control apparatus embodying such devices.

This application is a division of my application Serial No. 536,160, filed September 23, 1955, entitled "Electrical Control System."

In general, devices embodying certain of the principles of the present invention comprise a movable element the position of which is controlled by means responsive to a plurality of input conditions. In the disclosed representative arrangements, these devices are thermally actuated, the movable element being bendable or deflectable in response to applied heat. One or more heater windings disposed in heat-transfer relationship with the movable element serve to translate the input conditions into heat to control the movable element.

In accordance with the principles of the invention, where plural windings are provided, the energization of one of the plural heater windings tends to cause the movable element to deflect or be moved in one direction, whereas the energization of another one of those windings tends to cause the movable element to deflect or be moved in another, normally opposite, direction. Thus, in the devices exemplarily disclosed, the movable element comprises two interconnected polymetallic portions, one end of one of those portions being effectively fixed against movement relative to a reference surface and one end of the other of those portions being effectively movable with respect to the reference surface. In a two-winding control arrangement, each of the two windings is effectively individual to each of the movable-element portions. The bidirectional action in response to applied heat may be accomplished by selecting the angle between the two portions or by reversing the constituent metallic strips between the two portions.

The movable element may be adapted to impart a mechanical motion to a device to be controlled, or may carry one or more electrical contacts mateable with one or more electrical contacts in order to produce a plurality of discrete electrical output indications. In either case, the relationships between the element, the windings, and other circuitry may be selected so that the deflectable or movable element will produce an output indication in response to either of two discrete input conditions, will produce an output indication only in response to an input condition, or input conditions, of a preselected nature, amplitude, duration or incidence, will produce an output indication only if one of two input signals exceeds the other in amplitude or duration or a combination thereof, will produce two different and discrete output indications in response to two different input signals, will produce a different output indication in response to each of two alternatively received input signals and will produce a still different output indication either if neither signal is received or if both signals are concurrently received, or will produce an output indication or indication in response to other selected input conditions.

The input signals may be interrelated in any appropriate fashion and may, in fact, be related to and controlled by the output indication of the device. The relative effectiveness of any group of input signals may be selected by proportioning the plural heater windings, by adjusting the deflectability or length of the several portions of the movable elements, or by controlling the rate of transfer of heat to and/or from the portions of the movable element.

The principles of the invention may be pragmatically embodied in a plurality of types of signaling and control circuits. Thus, in the particular examples disclosed herein, devices constructed in accordance with the principles of the present invention may be employed to sense the existence of a selected critical condition or conditions in an electrical system (such as the electrical system of an automobile), to signal the existence of that condition, and to periodically interrupt the transmission of the output signal to increase its effectiveness in alerting he who is in control of the equipment, such as the driver of the vehicle. The devices may also be employed as integrating relays responsive to a signal produced by a signaling relay in a gauging circuit to produce an output indication of the existence of a critical condition by actuating an alarm device, and possessing the additional capability of automatically testing the operability of the alarm device even though the sensible critical condition may not exist.

The principles of the invention may also be applied to the provision of a self-voltage-compensating signaling relay in a gauging system. In another form, the principles of the invention are exemplarily applied to improve the performance of a servo mechanism.

A fuller appreciation of the principles of the invention may be obtained from the following detailed description of embodiments of the invention when read with reference to the accompanying drawings in which:

FIG. 4 is a fragmentary diagrammatic representation of alternative gauging systems, with a voltage-compensated signaling relay interposed the voltage source and the gauging sub-circuit and adapted to sense a critical condition signified by high gauging-circuit current;

FIG. 5 is a fragmentary, diagrammatic representation of a system similar to that of FIG. 4 but with the signaling relay being inserted in a branch of the gauging circuit;

FIG. 6 is a fragmentary diagrammatic representation of a gauging system, with a voltage-compensated signaling relay interposed the voltage source and the gauging sub-circuit and adapted to sense a critical condition signified by low gauging-circuit current;

FIG. 7 is a fragmentary diagrammatic representation of an arrangement similar to that of FIG. 6 but with the signaling relay being inserted in a branch of the gauging circuit and with additional means being provided to vary the effective insertion impedance of the signaling relay;

FIG. 8 is a fragmentary diagrammatic view of a remote control system embodying the principles of the present invention;

FIG. 9 is a top plan view of a mechanism physically incorporating the elements represented within the dotted-line portion of FIG. 8;

FIG. 10 is a side elevational view of the structure of FIG. 9; and

FIG. 11 is an end elevational view of the structure of FIG. 9.

Figure 1:
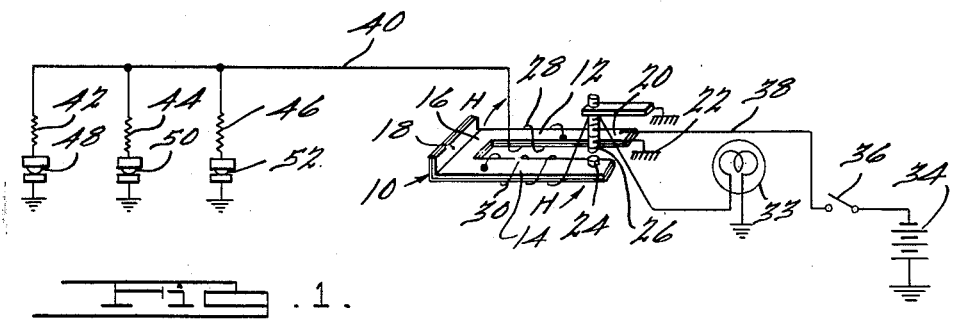
FIGURE 1 is a fragmentary diagrammatic representation of a condition-responsive signaling or control system embodying the principles of the present invention, with means being provided for producing a flashing or recurring output indication.

The relay structure represented in FIG. 1 of the drawings (as well as in FIGS. 3 to 8) is exemplarily disclosed as being of the type in which ambient-temperature compensation is accomplished by forming a bimetallic, trimetallic or, generally, polymetallic element into a generally U shape, with the interjoining crosspiece being formed, flanged, or reinforced so as to be relatively inflexible and unresponsive to temperature changes. Elements of this general nature are disclosed in detail in their structural environment in my copending application Serial No. 138,249, filed January 12, 1950, now Patent 2,762,997, granted September 11, 1956, as well as, in a different structural environment, in FIGS. 9–11 of the drawings hereof.

Referring to FIG. 1 of the drawings, relay 10 comprises a pair of bimetallic, trimetallic or polymetallic legs 12 and 14 disposed generally in spaced parallelism with one another, with one end of one of the legs joined to one end of the other by a crosspiece 16. Means such as an upturned flange 18 is provided to prevent effective bending of the crosspiece 16 in response to heat applied thereto. For convenience of illustration, the operating element of relay 10 is shown to be bimetallic, that is, it comprises two intimately associated sheets or strips of metal having disparate temperature coefficients of linear expansion. While other arrangements may be employed, in the disclosed arrangement, the entire upper surface is of one metal and the entire lower surface is of another, it being assumed, for purposes of illustration, that the metal on the lower surface of the unit has a higher temperature coefficient of linear expansion than the metal on the upper surface.

The end 20 of leg 12 is rendered immobile with respect to some reference surface (not shown) in any suitable manner. This immobility is signified in this figure (and in the other figures of the drawings) by a symbol such as the "earth" symbol 22 on FIG. 1. Two such symbols on any one figure may, but need not, denote the same reference surface. This fixing or immobilizing of the end 20 of the leg 12 is preferably such that leg 12 is effectively mounted substantially as a cantilever.

If the temperature of leg 12 is raised, that leg will tend to become arcuate in form, with the left-hand end thereof rising relative to that reference surface with respect to which the end 20 is fixed. As a result, crosspiece 16 will be tilted upward, its upper surface remaining roughly tangential to the curve defined by the upper surface of the adjacent end of leg 12. If leg 14 remains straight, with its upper surface coplanar with the upper surface of crosspiece 16, then it will be perceived that the right-hand end of leg 14 will be effectively moved downward. Thus, contact 24, mounted upon the right-hand end of leg 14, will be moved downward away from contact 26 which is adjustably fixed with respect to the same surface as is the end 20 of leg 12. Suitable adjusting means, if provided, may be of the form disclosed in my copending application Serial No. 526,190, filed August 3, 1955, now Patent No. 2,833,889.

Leg 14 may be considered to be mounted as a cantilever, in effect, upon the crosspiece 16. If the temperature of leg 14 is changed, that leg will also tend to assume an arcuate shape, with the right-hand end thereof moving upward with respect to the reference surface to move contact 24 toward contact 26. Hence, the effect of applying heat to raise the temperature of leg 12 is to move contact 24 away from contact 26, whereas the effect of applying heat to leg 14 is to move contact 24 toward contact 26. The position of contact 24 with respect to contact 26 will, therefore, be determined by the temperature of both legs 12 and 14.

As a modification of the described arrangement, the entire bimetallic element 10 may be pivotally mounted about a transverse axis extending longitudinally of the crosspiece 16, fixing the end 20 of the leg 12 either as shown or by merely providing stops for preventing rotation of that end 20, such as in the manner disclosed, for example, in J. W. Anderson Patent No. 1,885,054. Similarly, control of the characteristics of the device may be established by varying the relative lengths of the legs 12 and 14, by inserting nondeflective portions in or on those legs, by reinforcing one or both of the legs, and so on, such as is taught in my copending application Serial No. 526,190, filed August 3, 1955. It will also be appreciated that the length of the crosspiece 16 is not critical and may, in fact, be reduced to zero length, with leg 14 forming an acute angle with leg 12 in order that those legs, in deflecting, will not interfere with one another. It will also be appreciated that neither leg has to be perpendicular to the crosspiece and that the two legs need not be parallel.

In the arrangement disclosed in FIG. 1, the legs 12 and 14 are shown to be straight on the basis that there is no present application of applied heat to either leg and that the ambient temperature level is exactly that at which the element 10 was designed to have both of its legs straight. It will be appreciated that the characteristics of the element 10 may be so selected that if both legs 12 and 14 are at the same temperature, the relationship between contacts 24 and 26 will be the same, regardless of that temperature, whereby true ambient-temperature is achieved. Conversely, as noted, the relationships may be modified to produce any desired change of the relationship between contacts 24 and 26 upon change in ambient temperature.

Contacts 24 and 26 are normally closed, that is, regardless of the ambient temperature, those contacts are in engagement so long as no voltage is applied across either coil 28, effectively individual to leg 12, or coil 30, effectively individual to leg 14. While it will be recognized that as a practical matter the heat generated by coil 30 will affect leg 12 and the heat generated by coil 28 will affect coil 14 due to heat transfer by radiation or convection, or by conduction through the crosspiece 16, the primary effect of coil 30 is to control the temperature of leg 14 and the primary effect of coil 28 is to control the temperature of leg 12, and hereinafter in the specification reference will be made only to the primary heating effect of the several coils, the spurious or ancillary heat transfer being disregarded for clarity of description.

The system of FIG. 1 (and the other disclosed systems) may be employed for either signaling or control purposes, and the term "signaling" is intended to be generic to both concepts.

A suitable source of voltage 34 (such as the storage battery of an automobile or the complete voltage-supply system of an automobile including the generator, battery, and voltage-regulator, current-regulator and cutout assembly) is connectible through a switch 36, which may be an automobile's ignition switch, to conductor 38, which is mechanically and electrically secured to the element 10. Hence, upon the closure of switch 36, the entire element 10 is at a potential above-ground level, it being recognized that the mechanically fixing symbols, such as symbol 22, do not connote an electrical ground. One end of heating winding 28 is connected to leg 12, and hence to the source of potential, and the other end of that winding is connected to conductor 40. Conductor 40 is, in turn, connected to a plurality of paralleled resistors 42, 44 and 46, each of which is connected in series with an individual condition-responsive switch 48, 50 or 52, to ground.

Switches 48—52 are actuated by means (not shown) responsive to an individual critical condition of any suitable nature. For example, if the principles are to be applied to an automotive electrical system, switch 48 may be normally closed and adapted to be opened if the gasoline supply reaches a preselected minimum level, switch 50 is normally closed and may be adapted to open, for example, in response to the reduction in oil pressure of the automobile to a preselected minimum value, and switch 52 may similarly be adapted to open in response to any selected critical condition such as the attainment of a selected high coolant temperature or the reduction in coolant level below a preselected value.

If the sensed conditions are normal at the time that switch 36 is closed, current may flow from the potential source through the winding 28 and to ground over a relatively low-impedance path comprising resistors 42—46 in parallel. The resultant relatively high current magnitude through heating winding 28 will result in substantial deflection of the leg 12, tending to produce a tilting of the crosspiece 16 and a resultant downward movement (as represented in FIG. 1) of the right-hand end of leg 14 to move contact 24 in a direction away from contact 26.

One end of heater winding 30 is electrically integral with leg 14 and, hence, is connectible to the voltage source 34 upon the closure of switch 36. The other end of heater winding 30 is connected to fixed contact 26 and then to ground through the filament of lamp 33, which is intended to be but representative of any suitable alarm or control device. By virtue of this connection, with contacts 24 and 26 open, under the normal initial conditions, current will flow through the heater winding 30 and the filament of the lamp 33 in series. Depending upon the relative values of these two elements, lamp 33 will glow dimly or not at all. The current through winding 30 will produce an elevation of the temperature of leg 14 to cause the right-hand end thereof to deflect upward, in a direction tending to bring contact 24 into engagement with contact 26. Whether contact 24 will actually engage contact 26, in response to the initial closure of switch 36, depends upon the condition of contacts 48—52 and upon the relative rate of temperature elevation of leg 14 and leg 12. If all of the contacts 48—52 are closed when switch 36 is first closed, then whether contact 24 engages contact 26 initially is a matter for individual selection. Thus, if the rate of initial deflection of leg 12 is great relative to the rate of initial deflection of leg 14, contacts 24 and 26 will not be brought into engagement upon the closure of switch 36. On the other hand, if the rate of initial deflection of leg 14 is great relative to the rate of initial deflection of leg 12, contact 24 will engage contact 26. When this occurs, leg 14 and contacts 24—26 will constitute a low-impedance shunt across winding 30, lamp 33 will be brightly illuminated, and winding 30 will commence to cool. This initial bright illumination of lamp 33 will serve as an indication to the person controlling the system with which the disclosed apparatus is associated, such as the driver of the vehicle, that the signaling system is operative and, more particularly, that lamp 33 is in operating condition.

The cooling of winding 30 will permit leg 14 to cool and separate contact 24 from contact 26. Continuing on the assumption that contacts 48—52 are all closed, the parameters may be so selected that by this time leg 12 will be adequately heated to prevent any re-engagement of contact 24 with contact 26. However, if desired, repetitive initial flashing of the lamp 33 may be accomplished. Thus, upon the separation of contact 24 from contact 26, due to the shunting of winding 30, the low-impedance shunt across winding 30 will be relieved, winding 30 will again heat to deflect leg 14 to bring contact 24 again into engagement with contact 26 to again fully energize lamp 33 and to again shunt winding 30. This repetitive flashing will recur until such time as winding 28 has sufficiently deflected leg 14 so that contact 24 can no longer engage contact 26.

Under either arrangement, once leg 12 has been adequately heated, the system will remain in this condition until such time as one or more of the condition-responsive switches 48—52 is opened in response to the attainment of the individual critical condition. Upon the opening of any one or more of the contacts 48 to 52, the total impedance of the circuit is increased due to the deletion of one or more of the parallel paths including resistors 42, 44 and 46. The value of resistors 42, 44 and 46 are so selected that, upon the opening of any one or more of the contacts 48, 50 and 52, the reduction in current through heater winding 28 will be such that leg 12 will adequately cool to permit contact 24 to move into engagement with contact 26, this engagement occurring since heater winding 30 is energized.

This closure of contacts 24 and 26 will produce a shunting of heater winding 30 and a full energization of lamp 33 to signal the existence of the trouble condition. The shunting of the winding 30 will permit leg 14 to cool to separate contact 24 from contact 26, which will re-establish the energizing circuit for winding 30 and reduce the energization of lamp 33. The re-establishment of the energizing circuit for winding 30 will cause a reheating of leg 14 to again bring contact 24 into engagement with contact 26, and so forth, with lamp 33 repetitively flashing between a bright and dim intensity or between a bright intensity and extinction.

This repetitive flashing of alarm device 33 will continue until such time as switch 36 is opened or until the trouble condition is corrected so that contacts 48, 50 and 52 are again all closed.

It will be appreciated that the arrangement of FIG. 1 (as well as of FIG. 2) can be modified so that relay 10 senses and is responsive to high-current rather than low-current conditions and that, in that case, the lower ends of resistors 42 to 46 may be connected directly to ground, with the condition-responsive contacts 48 to 52 being normally open and connected in shunt of their individual resistors. Other modifications will be apparent to those skilled in the art.

Figure 2:
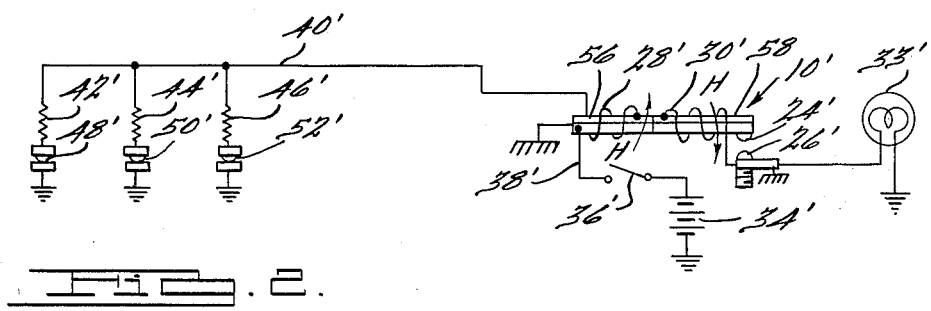
FIG. 2 is a fragmentary diagrammatic view of a system similar to that represented in FIG. 1 but employing a different form of signaling relay.
Figure 3:
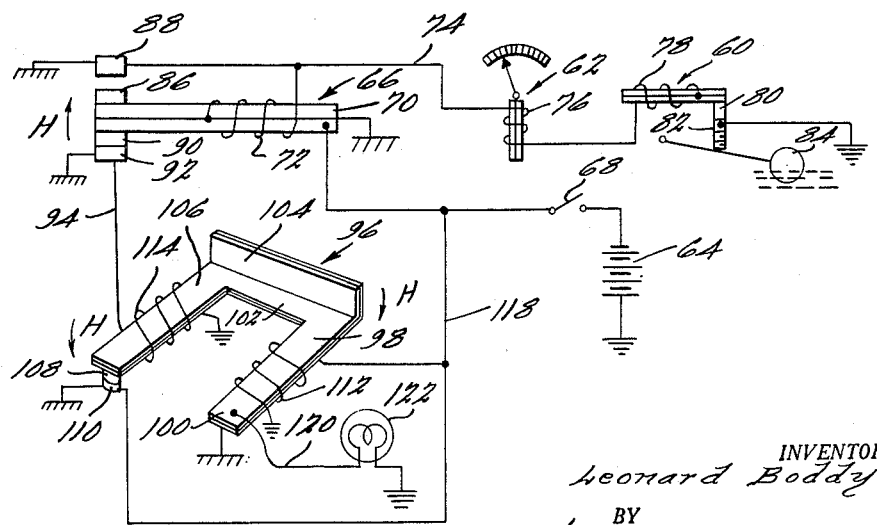
FIG. 3 is a fragmentary diagrammatic representation of a combined gauging and signaling system including a relay structure adapted both to act as a delay or integrating means and to automatically test the operability of the output indicating means.

The arrangement of FIG. 2 of the drawings is electrically and functionally identical to the arrangement of FIG. 1 and the corresponding electrical elements are correspondingly identified, the reference characters applied to the elements of FIG. 2 being distinguished by a prime. In the arrangement of FIG. 2, however, the element 10′ is shown to be rectilinear and to be divided into two portions, with the direction of deflection of the two portions being opposite to one another in response to applied heat. Thus, element 10′ comprises portions 56 and 58 rigidly interjoined in alignment with, and in extension of, one another. Each of the portions 56 and 58 comprises two elongated strips of metal intimately interjoined along their abutting faces. In the representative arrangement shown, the metal on the lower surface of portion 56 has a higher coefficient of linear expansion than the metal on the upper surface of that portion, whereas the metal on the upper surface of portion 58 has a higher coefficient of linear expansion than the metal on the lower surface of that portion. The metal on the lower surface of portion 56 may, but need not, be the same as the metal on the upper surface of portion 58; and the metal on the upper surface of portion 56 may, but need not, be the same as the metal on the lower surface of portion 58.

The left-hand end of portion 56 is immobilized with respect to the reference surface and the right-hand end of portion 58 carries the contact 24′. If winding 28′ upon portion 56 is energized, elevating the temperature of portion 56, the right-hand end of that portion will tend to deflect upwardly, thereby tending to move portion 58 and contact 24′ upwardly away from contact 26′. Conversely, if winding 30′ upon portion 58 is energized to apply heat primarily to portion 58, portion 58 will tend to bend with its right-hand end moving downwardly to carry contact 24′ toward contact 26′. Hence, windings 28′ and 30′ tend to move contact 24′ in opposite directions, just as was the case with the U-shaped element, or modifications thereof, represented in FIG. 1 of the drawings.

The operation of the arrangement of FIG. 2 is identical to that of FIG. 1 and will not be redescribed.

It will be appreciated that element 10′ of FIG. 2 may be modified within the scope of the present invention. Thus, a transverse pivotal axis may be established by means, for example, of a pivot pin supported with respect to the reference surface and supporting the polymetallic element at the line of junction of portions 56 and 58, the axis of rotation lying in a plane parallel with the upper and lower surfaces of the portions 56 and 58. Some means should be provided to limit the travel of the left-hand end of portion 56 without interfering with the pivotal action of the bimetal. Other arrangements performing equivalent functions will be apparent to those skilled in the art.

It will be noted that, in the exemplary systems of FIGS. 1 and 2, the relay serves as a signaling device and a flasher, and may also serve a lamp-proving function.

In the arrangement of FIG. 1, the element 10 is representatively provided with a pair of normally-open contacts. The arrangement of FIG. 3 demonstrates that a similar element may be provided with a pair of normally-closed contacts, and further demonstrates the use of a bi-directionally moving element in a gauging and signaling system. The representative gauging circuit depicted in FIG. 3 of the drawings comprises a sender 60, a gauge 62 and a source of potential 64 which may, for example, be the battery or the battery-generator-regulator combination of an automobile. A signaling relay 66 is inserted in the series gauging circuit which may be traced from source of potential 64, switch 68 (which may be the automobile's ignition switch), polymetallic element 70 and winding 72 of signaling relay 66, conductor 74, heater winding 76 of gauging element 62, heater element 78 of sender 60, and through contacts 80 and 82 to ground. Sender 60 is representatively shown to be responsive to the level of fuel in a gasoline tank as sensed by a float 84.

The operation of the gauging and signaling arrangement thus far described is or may be identical to that of the system disclosed in my Patent No. 2,625,595, granted January 13, 1953, and, in accordance with that disclosure, signaling relay 66 hereof may be provided with mateable contacts 86 and 88 adapted to modify and regulate the effective insertion impedance of the signaling relay 66.

In general, as is described in that patent, the magnitude of the current through winding 72 of signaling relay 66 will be controlled by the sender 60, with the amplitude of that current varying as an inverse function of the amount of gasoline in the tank. If there is more than a preselected critical quantity of gasoline in the tank, heater winding 72 of signaling relay 66 will be sufficiently energized to cause contact 90 to separate from contact 92, the latter of which is either fixed with respect to a reference surface, as represented, or is adjustably fixed with respect to that reference surface. Due to the thermal nature of signaling relay 66, that relay in itself tends to perform an integrating function so that transient movements of the gasoline in the tank, as reflected in transient movements of the float 84, will not tend to substantially change the condition of signaling relay 66, that relay tending to reflect average levels of the float 84 over finite periods of time.

If the gasoline level reaches the preselected critical value, the current through winding 72 of signaling relay 66 will be reduced to the point where the polymetallic element 70 will cool adequately to permit contact 90 to re-engage contact 92, thereby to connect the source of potential 64 through the element 70 to contact 92 and conductor 94.

The output of relay 66 is a change on the potential of conductor 94. Thus, since contacts 90 and 92 are closed when switch 68 is open, at the instant of closure of switch 68 substantially the full potential of source 64 will be applied to conductor 94. If the gasoline supply is adequate, contact 90 will be separated from contact 92, after a heating interval, to disconnect conductor 94 from the source of potential 64. If the supply of gasoline is low when switch 68 is closed, contact 90 will not be separated from contact 92 and the source of potential 64 will continuously be connected to conductor 94. If the supply of gasoline is initially adequate but subsequently drops to the preselected critical value, contact 90 will reclose to contact 92 to again apply the potential from source 64 to conductor 94.

While, as noted, signaling relay 66 does tend to perform an integrating function, in practice it is frequently desirable to provide further integrating means to insure that a signal denoting the attainment of a critical condition is not transmitted unless a critical condition does, in fact, exist during the course of operation of the vehicle or the associated system. Such separate integrating means are shown, for example, in the referenced Patent No. 2,625,595, and, as shown in that patent, any such integrating means may be shared in common by a plurality of gauging and signaling relay circuits. Thus, in the arrangement of FIG. 3, additional gauging and signaling relay circuits can be provided, with the other signaling-relay contacts correlative to contact 92 being multiplied to conductor 94.

Relay 96 serves, in addition to another function, an integrating function. That element comprises a first leg portion 98, the end 100 of which is fixed with respect to a reference surface, a crosspiece 102 rendered relatively inflexible by means such as a flange 104, and a leg portion 106, one end of which is effectively integral with the crosspiece 102. Again, this arrangement is but representative and may be modified within the scope of the invention, suggested modifications being previously noted with reference to FIG. 1 of the drawings.

The free end of leg 106 carries an electrical contact 108 mateable with a contact 110 which is fixed or adjustably fixed with respect to the reference surface. Leg 98 is provided with a heater winding 112 adapted to apply heat primarily to leg 98, and leg 106 is provided with a heater winding 114 adapted to apply heat primarily to leg 106. In this arrangement, it is assumed that the metal on the upper surface of element 96 has a greater coefficient of linear expansion than the metal on the lower surface. As a consequence, elevating the temperature of leg 98 will tend to cause the non-fixed end thereof to move downwardly (in the representation of FIG. 3), so moving and tilting crosspiece 102 that the position of leg portion 106 is changed in a direction to separate contact 108 from contact 110. Conversely, the application of heat to leg 106 will tend to cause that leg to become deformed or bent to move contact 108 toward contact 110.

With switch 68 open and with temperature equalization having occurred, contact 108 is in engagement with contact 110. Hence, upon the closure of switch 68, the source of potential 64 is connected via conductor 118, through contacts 110 and 108, leg 106, crosspiece 102, leg 98, conductor 120, and through alarm or control device 122 to ground, alarm or control device 122 being representatively shown to be a lamp. It will be appreciated that the point of connection of conductor 120 to the bimetallic portion of element 96 is not important from an electrical standpoint, since the electrical resistance of the bi- or polymetallic portion of that element is normally very low, particularly if a trimetallic member is employed to obtain improved conductivity.

By virtue of the completion of the described circuit, immediately the closure of switch 68, lamp 122 will be fully illuminated to indicate to the operator of the vehicle that the lamp 122 is in operating condition.

Additionally, upon the initial closure of switch 68, current will flow through heater winding 112, connected between conductor 118 and ground, and current will also flow through element 70, contacts 90 and 92, conductor 94, and through winding 114 to ground. The effect of the application of heat to leg 106 by winding 114 is to maintain contact 108 in engagement with contact 110, in spite of the opposing effect of the application of heat to leg 98 by winding 112. Hence, lamp 122 will remain illuminated.

Assuming that there is an adequate supply of gasoline, after an appropriate heating interval, signaling relay 66 will open contact 90 from contact 92, as previously described, resulting in the de-energization of heater winding 114 of relay 96. The resultant reduction in temperature of leg or portion 106 toward the ambient level, coupled with the fact that leg 98 is at an elevated temperature, will cause contact 108 to be separated from contact 110, interrupting the previously traced energizing circuit for lamp 122 whereupon that lamp becomes extinguished.

The apparatus continues in this condition as long as winding 114 remains de-energized, contact 108 being held out of engagement with contact 110 by the continuing energization of winding 112. If a critical signal condition subsequently occurs, such as the reduction in gasoline level below the preselected critical level, voltage is again applied to conductor 94 by the closure of contact 90 of relay 66 to contact 92, and portion 106 of element 96 is again deflected to bring contact 108 into engagement with contact 110 to recomplete the energizing circuit for lamp 122 to signal the existence of the critical condition. The signal will continue until the critical condition is relieved or until switch 68 is opened. Thus, element 96 includes a pair of normally closed contacts and serves the conjoint functions of an integrating relay and a lamp-proving relay.

Electrical gauges are customarily adapted to measure levels of and changes in voltage, current or power. In the development of gauging circuits for automobiles and certain other similar applications, the accuracy of gauging is affected by the fact that the source voltage tends to vary. While modern automobiles conventionally include a regulating unit for controlling the voltage output of the supply system including the battery and the generator, the percentage variation of this output voltage is such that a simple gauging device will prove insufficiently accurate properly to perform its function, since it reflects the changes in the supply voltage. In systems of the type shown in the referenced Patent No. 2,625,595, the sending units themselves are designed to tend to compensate for variations in the supply voltage. In other systems, such as those disclosed in my copending application Serial No. 138,249, filed January 12, 1950, a separate voltage-regulating device is provided intermediate the gauging systems and the main source of voltage so that the average or mean effective value of the voltage applied to the gauging circuits is substantially constant. In still other systems, electro-magnetic gauging devices are employed having two coils in quadrature and conjointly controlling the position of a movable vane element. In practice, both of these windings are connected to reflect the value of the supply voltage but to so act in opposition upon the vane that variations in supply voltage are effectively canceled.

In order to interpose a signaling relay in a gauging circuit of the last noted type, some means must be provided for rendering that signal relay, per se, substantially insensitive to supply-voltage variations. Otherwise, even though the gauging element is capable of providing a substantially accurate reading despite variations in supply voltage, the signaling relay, intended to be responsive to a critical condition of the apparatus with which the gauging system is associated, will tend to vary in its operation as a function of the variations in the supply voltage. The arrangements of FIGS. 4–7 are designed to properly signal the existence of a critical condition even though the voltage of the source of supply varies over a substantial range.

In certain of the electromagnetic or galvanometer type gauging systems employed in or known to the art, the existence of a critical condition is denoted by high current amplitude in the gauging circuit, whereas in other such systems the existence of a critical condition is denoted by low current amplitude. The arrangements of FIGS. 4 and 5 demonstrate the application of the principles of the present invention to high-current-amplitude critical condition systems and the arrangements of FIGS. 6 and 7 relate to systems in which the critical condition is denoted by low current amplitudes. In the arrangements of FIGS. 4 and 6, the signaling relay is interposed the source and the remaining elements of the gauging sub-circuit, whereas in the arrangements of FIGS. 5 and 7, the signaling relay is interposed the gauging device and the sender or transmitter, that is, the signaling relay is inserted in the signaling branch.

In each case, the basic gauging circuit, without a signaling relay, comprises a simple series circuit including a source of voltage, a switch, one winding of the dual-winding gauging device, and variable resistance element, the resistance of that element varying as a function of some condition to be sensed. An additional circuit is provided including the source of potential, the switch and the other winding of the dual-winding gauging device to provide for voltage-variation compensation. Thus, in the arrangement of FIG. 4, a typical temperature-responsive gauging system might include a source of potential 140, a switch 142, conductor 144 connected directly to conductor 146 (contrary to the present showing), winding 148 of gauging device 150 and resistor 152 which has a negative temperature coefficient of resistance so that its resistance decreases as its temperature increases, resistor 152 being disposed in a position to sense the temperature, for example, of the coolant in an automobile. The other winding 154 of the dual-winding gauging device 150 is connected between conductor 146 and ground so that, in a pure gauging system, winding 154 would be directly across the voltage source 140. Hence, variations in the source 140 would affect both the current through the winding 154 and the current through the winding 148, with their effects upon the moving vane being so proportioned that the voltage variations are cancelled. In this system, since the resistance of element 152 decreases with temperature, the current through conductor 146 and winding 148 will be at a value approaching its maximum value when a critical condition of high coolant temperature exists.

While coils 148 and 154 are in parallel with the source 140 in the described arrangement, they may also be placed in series with one another across the voltage source, as is exemplified by the gasoline-level measuring system alternatively represented in FIG. 4 of the drawings. Thus, the gauging circuit, per se (omitting the signaling reply), in such a system would include a source of potential 140, switch 142, conductor 144 connected directly to conductor 156 (contrary to the showing of FIG. 4), winding 158 of the dual-winding gauging device 160, one branch path comprising the other winding 162 thereof, and another branch path comprising resistor 164. The effective value of resistor 164 is determined by the position of float 166 which is disposed in the gasoline tank. Low gasoline level causes the resistance of resistor 164 to be reduced toward a minimum value so that the current through conductor 156 and winding 158 will approach a maximum value as the critical condition to be sensed is reached.

In either case, winding 168 of signal relay 170 is inserted in series with the gauging circuit and between the source of potential and the gauging device 150 or 160. Thus, in the representative arrangement, conductor 144 is electrically integral with leg or portion 172 of signaling relay 170, leg 172 being electrically and mechanically integral with crosspiece 174 and leg portion 176. One end of winding 168 on leg 176 is connected to leg 176 and hence, electrically, to conductor 144, and the other end of winding 168 is connected to conductor 178 which is connected either to conductor 146 or conductor 156 in accordance with the particular gauging system selected. Hence, the current through winding 168 will vary as a function of the variations in current through winding 148 or winding 158 and will approach a relatively high value at the critical condition, the existence of which is to be signaled. While the interposition in the gauging circuit of an additional resistance, represented by winding 168, will tend to affect the functioning of the gauging circuit, the fact that it is a maximum signal condition which is to be sensed permits the resistance of the winding 168 to have a very low value and still be capable of developing sufficient wattage at the signaling condition to adequately elevate the temperature of leg 176 of signaling relay 170. This resistance may, in fact, be so low as to produce no substantial inaccuracy in the gauging circuit even without readjustment of the gauge, at the critical, high-current condition, and, of course, its effect over the entire range of normal conditions will be less.

Specifically, the value of resistor 152 approaches a minimum as the temperature of the coolant approaches the critical high level. At any lower temperature, the resistance of sensing element 152 is greater. Hence, at any temperature below the critical temperature to be sensed, the percentage of the total circuit resistance which is represented by winding 168 is less than it is at the critical condition. Similarly, the percentage of the total circuit resistance in the circuit, including heater winding 168, winding 158 and resistor 164, is greater at the critical condition of low fuel level than it is at any other fuel-level condition. Therefore, the maximum error in the gauge reading due to the insertion of the signal relay 170 in the circuit will occur at the critical signal condition, and this error will be small, even though not compensated for by modification or adjustment of the gauge, due to the relatively low value of resistance of the winding 168.

The forward end 180 of portion 172 of relay 170 is fixed relative to a reference surface. The metal on the upper surface of the bi- or polymetallic element is assumed to have a higher coefficient of linear expansion than the metal on the lower surface so that the application of heat to leg 172 will tend to move contact 182 away from contact 184, whereas the application of heat to winding 168 will tend to move contact 182 toward contact 184.

Winding 186 on leg 172 is connected between conductor 144 and ground, and hence the entire source voltage is applied thereacross. An increase in the effective voltage of the source 140 will produce an increased heating of leg 172 tending to further separate contact 182 from contact 184, but the same increase in source voltage will also produce an increased current through winding 168, and hence an increased heating of leg 176, tending to force contact 182 toward contact 184. The converse is true in the case of reduction of the effective value of the voltage of source 140. By appropriate selection of the circuit parameters and appropriate design of the relay 170, these variations in source voltage may be effectively compensated so that there is substantially no movement of contact 182 relative to contact 184 with variations in source voltage over an expected range. It will be noted that the relay 170 is or may be ambient temperature compensated by virtue of its construction.

In the event that current through winding 168 increases to the preselected value as the result of the temperature of the coolant rising to the selected circuit value or the level of the gasoline falling to the selected critical value, portion 176 will be deflected to bring contact 182 into engagement with contact 184, whereupon the source voltage will be applied across winding 190 of integrating relay 192. If contact 182 remains closed to contact 184 for the appropriate selected time interval, or if, in a preselected total time interval, contact 182 is closed to contact 184 for a sufficient percentage of the time, integrating relay 192 will operate to bring the normally separated contacts 194 and 196 into engagement with one another to apply the voltage of source 140 across the indicating, alarm or control device 198, representatively shown to be a lamp. Lamp 198 will continue to be operated until such time as the critical condition is rectified or the switch 142 is opened.

Those elements of FIG. 5 corresponding to elements of FIG. 4 are correspondingly identified except for the addition of a prime symbol. The system of FIG. 5 is identical to that of FIG. 4, and operates identically, except that winding 168' of signaling relay 170' is inserted in the primary gauging branch of the circuit, between the gauge 160' and the transmitter 164', winding 168' being totally insulated from the bimetallic member. The effect of the insertion resistance of winding 168' in the gauging circuit of FIG. 5 tends to be greater than it is in the arrangement of FIG. 4. Hence, while not necessary, it is advantageous to design and calibrate the magnetic gauge unit 160' to compensate for this insertion resistance, in order that error-free operation may be achieved. Again, however, the signaling relay is properly compensated for variations in the voltage of the supply and is or may be compensated for ambient temperature variations. While the arrangement of FIG. 5 is predicated upon the use of a signaling relay in a gauging circuit for detecting the level of gasoline in the tank, it will be apparent that the arrangement may be modified in accordance with the teachings of FIG. 4 or the knowledge in the art to permit the gauging of any other condition which may become critical in the apparatus, such as an automobile, with which the system is asosciated.

FIG. 6 of the drawings discloses one method of associating a signal relay with a magnetic-type gauging system in which the condition to be sensed is denoted by low or minimum amplitude of current in the gauging circuit. In this system, the closure of switch 200 connects source 202 to the bimetallic or polymetallic element of signaling relay 204 and, hence, across winding 206 mounted upon leg 208. One end of heater winding 210, mounted upon or wound around leg 212, is connected to the bimetal element and, hence, through switch 200 to source 202, and the other end of winding 210 is connected to ground, over one path, through coil 214 of the magnetic gauge unit 216 and, over another path, through coil 218 of unit 216 and variable resistor 220. For purposes of illustration, resistor 220 has been shown to be variable as a function of the level of gasoline in the tank, under the control of float 222, but in this case, low gasoline level results in a maximum value of resistance of resistor 220 so that the critical condition to be sensed—low gasoline supply—is that of minimum current in the circuit including winding 210 and coil 218. As a result, a somewhat larger resistance heater winding 210 must be employed than is the case in the system of FIG. 4, for example, but it has been found that with existing gauging systems adequate wattage may be obtained to permit proper operation of the signaling relay 204 without varying the calibration accuracy of the gauge 216 to an extent detectable by the driver. For example, in one pragmatic application, the insertion of the signal relay was found to produce a change in the calibration of the gauge 216 of about 2%.

In the arrangement of FIG. 6, the two metal strips forming the bimetallic element are assumed to be reversed, or the entire unit inverted, with respect to the unit of FIG. 4 so that the application of heat to leg 212 will tend to move contact 224 away from contact 226, whereas the application of heat to leg 208 will tend to move contact 224 toward contact 226. Contacts 224 and 226 are in engagement when switch 200 is open. Upon the closure of switch 200, the application of heat to leg 212 by winding 210 will produce a separation of contacts 224 and 226, assuming a critical condition does not exist, and winding 206 will operate as a voltage compensating winding in the same fashion as previously described. If, at any time, contact 224 is closed to contact 226 for the requisite interval or for the requisite percentage of a preselected interval, integrating relay 228 will bring contact 230 into engagement with contact 232 to energize the signaling or control device 234.

The arrangement of FIG. 7 is similar to that of FIG. 6 except that the signaling relay is placed in the gauging branch circuit, and similar reference characters are applied to corresponding parts, a prime mark being affixed to the characters of FIG. 7. The sensing heater winding 210' of signal relay 204' is connected in series between the coil 218' of the gauge 216' and resistor 220', neither end of winding 210' being connected directly to the bimetal or directly to the course of potential 202'. The operation of the arrangement of FIG. 7 is identical to that of FIG. 6, except for the noted difference in the point of interposition of the signaling relay in the gauging circuit and except for the provision of an additional winding 238 and an additional pair of contacts 240 and 242 on relay 204'. Contact 240 is mounted upon the free end of leg 212' on the opposite side thereof from contact 224'. However, contact 240 is insulated from portion 212'. Contact 240 is normally separated from but is engageable with an electrical contact 242, and heater winding 238 is connected between coil 218' of gauge 216' and contact 242.

As previous noted with respect to FIG. 6 of the drawings, at the critical condition which is to be sensed and signaled, the value of resistor 220' is at or is approaching its maximum value. Hence, even though the resistance of winding 210' must be larger than in the cases of FIGS. 4 and 5 to provide the requisite wattage at the low-current condition to operate the signal relay 204', still the percentage of the total circuit resistance represented by winding 210' is small at the critical condition. However, if the fuel tank is approaching a full condition, the value of resistor 220' is reduced to a relatively small value so that at that time the resistance of heater winding 210' represents an appreciably larger percentage of the total circuit resistance. This tends to interfere with the calibration of gauge 216' at the upper or full end of the scale. By the provision of winding 238 and contacts 240 and 242, signaling relay 204' may be endowed with a variable-impedance characteristic so that the effects of its insertion are not as significant as would otherwise be the case. As the fuel level approaches the full condition, so that the value of resistor 220' is decreased, the current through heater winding 210' is increased. At some selected current amplitude, leg 212' is deflected adequately to bring contact 240 into engagement with contact 242, whereupon winding 238 is connected in parallel with winding 210' in the gauging circuit so as to reduce the total effective impedance of the signal relay in the gauging circuit. This paralleling connection will also reduce the total applied heat to leg 212' so that contact 240 will tend to separate from contact 242, but upon such separation, the heating effect is increased so that contact 240 will again be brought into engagement with contact 242. Over a selected range of current amplitudes in the gauging circuit, therefore, contacts 240 and 242 may be maintained in a condition of incipient opening and closing to adjust the effective insertion impedance of the relay 204' to minimize the effect thereof upon the calibration of gauge 216'. At levels of current in excess of this range, contact 240 will or may remain in engagement with contact 242 so that the insertion resistance is maintained at a steady, low value at or near the full scale position of gauge 216'. As a result, calibration of gauge 216' throughout its range may be maintained within close limits despite the interposition of the signaling relay in the gauging circuit. The signal relay is preferably employed with gauging devices having viscous or other damping to reduce needle flutter from car vibration, gasoline splash, etc.

It will be appreciated that the previously noted modifications of the relay structures, per se, are also applicable to the relay structures of FIGS. 4–7.

In the arrangement of FIG. 8 a dual-winding, bidirectionally controlled relay is provided which has three discrete operational positions and which is adapted to operate as a control device in, for example, a servo system. Relay 250 comprises a pair of spaced-apart legs or portions 252 and 254 interjoined by a crosspiece 256 which is rendered relatively inflexible by any suitable means such as a flange 258. The unit is or may be ambient-temperature compensated. The end 260 of portion 252 is fixed with respect to a first reference surface (which may itself be moveable with respect to another reference surface), in a manner hereinafter to be described. The free end of leg portion 254 carries a pair of contacts 262 and 264 both of which are electrically and mechanically integral with portion 254. Contact 262 is mateable with an electrical contact 266 and contact 264 is mateable with an electrical contact 268, both of the contacts 266 and 268 being fixed or adjustably fixed with respect to a reference surface (which may be fixed or moveable with respect to the noted first reference surface). Heating means in the form of a winding 270 are mounted in heat transfer relation with portion 252, with one end of the winding 270 being electrically connected to portion 260, the entire bimetallic or polymetallic element being connected to ground. A heater winding 272 is mounted in heat transfer relation with portion 254, with one end of that winding being connected to portion 254, and, hence, to ground. Representatively, the metal having the higher thermal coefficient of linear expansion is mounted on the upper surface of the element 250 so that elevation of the temperature of portion 252 will tend to move contact 262 upwardly into engagement with contact 266, whereas elevation of the temperature of portion 254 will tend to move contact 264 downwardly into engagement with contact 268.

Element 250 is shown in FIG. 8 to be a constituent part of a control system, such as a closed-loop servo system, adapted to respond to the movement of a lever or the rotation of a shaft, or other mechanical movement, to control an output device such as a motor. For example, the arrangement herein disclosed may be employed as an improvement of a portion of the system utilized to adjust the attitude or levelness of an automobile body with respect to its wheels under diverse load conditions. Such a system is disclosed in, for example, an article commencing on page 125 of the February 1955 issue of the magazine entitled "Electrical Manufacturing" and entitled "New Packard Features Electrical Servo in Torsion-Bar Suspension." In that representative arrangement, optimum operation of the torsion-bar suspension system is achieved if the normal or average torsion of the bars is maintained at a selected design value. The design value, however, must be selected in the light of an estimated average distribution of load in the automobile. In practice, actual load distributions frequently vary from the design load distribution. In consequence, it is desirable to provide a compensator system comprising means for sensing the amount of torsion of one or both of the torsion bars and means responsive thereto for appropriately shifting the attitude of the automobile.

The amount of twist of one or both of the main torsion bars is communicated through a sensing lever to a control apparatus adapted to translate this input information into electrical control signals which are applied to two output conductors. These signals are employed to control the selective operation of a reversible motor. An improved form of that control apparatus is represented in FIGS. 9–11 of the accompanying drawings. In those figures, control lever 280 (FIG. 10) is adapted to be rotated through arcs in either direction and about the longitudinal axis of shaft 282 by means including a sensing lever (not shown). Shaft 282 is rotatably supported within a sleeve 284 which is or may be integrally cast with a base plate 286, being further supported with respect thereto by reinforcing webs 288 and 290 (FIGS. 10 and 11). At its lower end, shaft 282 is provided with a non-circular projection 292 (FIG. 10) by means of which shaft 282 and control lever 280 are securely interjoined. A washer 294, which may be of cork or similar material, for example, is interposed between the control lever 280 and the lower surface of the sleeve 284.

Shaft 282 extends above the base plate 286 and is secured at its upper end to an actuator 296 (FIGS. 9–11). A tubular drive member 298 surrounds a portion of the shaft 282 between the base plate 286 and the actuator 296, but is capable of rotational movement relative to both the base plate 286 and the shaft 282. A coil spring 300 is mounted upon a reduced-diameter portion of the drive member 298 and its two ends 302 and 304 are disposed upon opposite sides of a projection 306 (FIG. 11) integral with a horizontally disposed arm 308 which is a part of the drive member 298. The spring ends 302 and 304, also embrace a finger 310 on the actuator 296.

A rigid plate of insulating material 312 is firmly secured to the arm 308 and carries a pair of spaced apart contact bearing arms 314 and 316 extending downwardly therefrom. Arm 314 is engageable with a stop member 318 and arm 316 is engageable with a stop member 320, both of which are rigidly secured to the base plate 286 but are electrically insulated therefrom.

Upon arcuate movement of control lever 280 and hence, of shaft 282, the rotational motion is communicated through actuator 296 and its finger 310 to the coil spring 300, with that spring moving projection 306 and hence arm 308 on the drive member 298. The tension of the spring 300 is such that any rotation of the shaft 282 will be communicated through the described train to move arm 308, insulating plate 312 and depending arms 314 and 316 until such time as arm 314 or 316 strikes stop 318 or 320. Upon that event, any further rotation of the shaft 282 will only be applied to spring 300, with the arm 308, the insulating plate 312 and the depending arms 314 and 316 remaining at their limit position. If desired, means may be provided for establishing a limit to the maximum rotation of shaft 282 in either direction. For example, a rod 324 (FIGS. 9 and 10), secured to the shaft 282, may extend through a slot 326 in the side of the drive member 298 and be engageable with stop pins 330 and 332 (FIG. 9) secured to the base plate 286.

A contact 334 is mounted upon an arm 336 (FIGS. 10 and 11) secured upon the base plate 286. Arm 336 is insulated from base plate 286 but is electrically integral with terminal 338. Contact 334 is positioned, by bending arm 336, so that contact 317 on depending arm 314 will engage contact 334 before depending arm 316 strikes stop 320, and so that contact 319 on depending arm 316 will engage contact 334 before depending arm 314 strikes stop 318. The electrical effect of the engagement of these contacts will be described hereinafter.

One end of the element 250 (previously described with reference to FIG. 8) is secured to an upstanding portion 340 on the arm 308, so that the element 250 lies generally in a vertical plane with the contacts 262 and 264 carried thereby normally lying at a point intermediate contacts 266 and 268 (FIGS. 8 and 10), contact 266 being supported upon an arm 342 and with contact 268 being supported upon an arm 344. Arms 342 and 344 are secured to but insulated from the base plate 286.

The previously described arcuate motion of arm 308 will shift the position of element 250 so as to bring the contact 262 or 264 thereon closer to the contact 266 or 268 with which it is to meet, in accordance with the direction of rotation of shaft 282, but this mechanical movement will not cause contact 262 to engage contact 266 nor will it cause contact 264 to engage contact 268, energization of one or the other of the windings 270 or 272 on the element 250 being required to cause engagement of one or the other of these pairs of contacts.

A pair of relays 348 and 350 is mounted upon a bracket 352 secured to the base plate 286, and these relays, the bimetallic or polymetallic element 250 and the windings thereon, the contacts 266 and 268, the fixed contact 334 and contacts 317 and 319 on depending arms 314 and 316 are electrically interconnected in the fashion shown in FIG. 8 of the drawings.

As is shown in FIG. 8, the relatively fixed contact 334 is connected to a source of potential 356, which may represent the voltage supply system of an automobile, through a switch 358, which may be the automobile's ignition switch.

Whenever contact 317 is moved into engagement with contact 334, this voltage is applied via conductor 360 to the heater winding 270, the other end of which is connected to ground. The energization of winding 270 will serve to elevate the temperature of leg 252, tending to move contact 262 toward and into engagement with contact 266. The thermal delay between the time of closure of contact 317 to contact 334 and the closure of contact 262 to contact 266 may be selected in accordance with the desired operating conditions. This time delay, which may be, for example, in the order of six seconds, permits the system to be insensitive to transient shifts in position or attitude of the automobile so that corrective action will be taken only in response to a continuing condition, such as an increased or decreased loading of the vehicle.

When contact 262 engages contact 266 a circuit is completed from the source of potential 356, switch 358, contacts 334 and 317, winding of relay 348, contacts 266 and 262, and through the bimetallic element to ground at the end 260 thereof. In response to this energization of its winding, relay 348 closes its No. 1 contacts to complete a sealing or locking circuit for itself since the armature element of that pair of contacts is connected to ground. Relay 348, in operating, also closes its No. 2 contact to apply ground to conductor 362 as one of two output signals.

If, alternatively, contact 319 is moved into engagement with contact 334, a circuit is completed from source 356, switch 358, contacts 334 and 319, winding of relay 350, conductor 364 and through the heater winding 272, the other end of which is connected to the element 250 and, hence, is connected to ground. As a result, the heater winding 272 is energized in series with the winding of relay 350. The resulting current is inadequate to cause the operation of relay 350 but is adequate to sufficiently energize winding 272 to cause leg portion 254 of element 250 to be deflected downwardly to bring contact 264 into engagement with contact 268 after a selected delay interval, such as the aforesaid six seconds. The closure of contact 264 to contact 268 connects ground to conductor 364 so that the winding of relay 350 is effectively connected directly across the voltage source 356, operating relay 350. Relay 350, in operating, closes its No. 1 contact to complete a locking or sealing circuit for itself and closes its No. 2 contact to apply ground to conductor 366 to transmit the other of the two output signals. It will be observed that the closure of contact 264 to contact 268 establishes a shunt across heater winding 272 so that leg 254 will commence to cool to separate contact 264 from contact 268. However, prior to the time of this separation, relay 350 will have operated and locked or sealed operated.

As representative parameters, the source 356 may have a nominal output voltage of twelve volts, winding 270 may be 92 ohms, winding 272 may be 42 ohms, and relays 348 and 350 may be provided with 40-ohm windings.

The output signals on conductors 362 and 366 are adapted to control the extent and the direction of rotation of a motor 368 which is mechanically connected, in a manner not shown, to correct the condition which created the input signal to the system. In practice, as shown in the above-referenced article, the signals on conductors 362 and 366 are employed to actuate intermediate relays since the motor-current amplitudes are quite high.

While it will be apparent that the embodiments of the invention herein disclosed are well calculated to fulfill the objects above stated, it will be appreciated that the invention is susceptible to modification, variation and change without departing from the proper scope or fair meaning of the subjoined claims.

What is claimed is:
1. An ambient temperature compensated thermally responsive device comprising first and second elongated polymetallic portions, one end of said first portion being joined to one end of said second portion, means fixing the other end of said first portion, said device being characterized in that heat applied to said first portion tends to cause the other end of said second portion to deflect in one direction and heat applied to said second portion tends to cause said other end thereof to deflect in a direction opposite to said one direction, said first and second portions having similar temperature-deflection characteristics so that equal heating of both of said portions will produce substantially no movement of said other end of said second portion, a pair of electrical contacts controlled by said portions, means for initially operating said device and then releasing it and then holding it in a released state comprising first and second separate means for separately heating said first and second portions, one of said separate means initially heating one of said portions faster than the other one of said portions to actuate said electrical contacts, means effective upon actuation of said electrical contacts to deenergize said one of said separate means to deactuate said contacts, and means comprising the other one of said separate means and the other one of said portions for thereafter holding said electrical contacts deactuated in spite of the reenergization of said one of said separate means.

2. An ambient temperature compensated thermally responsive device comprising an element at least a part of which is bendable in response to applied heat, first heater winding means disposed in heat transfer relation to a first part of said element and energizable to deflect a portion of said element in one direction, second heater winding means disposed in heat transfer relation to a second part of said element and energizable to deflect said portion of said element in a direction opposite to said one direction, said first and second parts being mechanically interjoined and lying side by side in substantial spaced parallelism with one another, a first electrical contact, a second electrical contact carried by said portion and mateable with said first electrical contact, said first and second parts having similar temperature-deflection characteristics so that equal heating of both of said first and second parts will produce substantially no movement of said portion of said element, means independent of said electrical contacts for controlling the energization of said heater winding means, and means including said electrical contacts for controlling the energization of the other one of said heater winding means.

3. The arrangement of claim 2 further characterized in that said electrical contacts are in engagement when neither of said heater winding means is energized.

4. The arrangement of claim 2 further characterized in that said electrical contacts are separated from one another when neither of said heater winding means is energized.

5. An ambient temperature compensated thermally responsive device comprising first and second elongated polymetallic thermally bendable portions, means fixing one end of said first portion, means interjoining the other end of said first portion and one end of said second portion, heater means in heat transfer relation with said first portion for bending said first portion to tend to move the other end of said second portion in one direction, heater means in heat transfer relation with said second portion for bending said second portion to tend to move said other end of said second portion in a direction opposite to said one direction, a first electrical contact, a second electrical contact carried by said other end of said second portion and mateable with said first electrical contact, said first and second portions having similar temperature-deflection characteristics so that equal heating of both of said portions will produce substantially no movement of said other end of said second portion, means for initially operating said device and then releasing it and holding it in a released state comprising both of said heater means, one of said heater winding means initially heating one of said portions faster than the other one of said portions to actuate said electrical contacts, means effective upon actuation of said electrical contacts to deenergize said one of said heater means to deactuate said electrical contacts, and means comprising the other one of said heater means and the other one of said portions for thereafter holding said electrical contacts deactuated in spite of the reenergization of said one of said heater means.

6. A thermally responsive device comprising an element at least a part of which is bendable in response to applied heat, first heater winding means disposed in heat transfer relation to said element and energizable to deflect a portion of said element in one direction, second heater winding means disposed in heat transfer relation to said element and energizable to deflect said portion of said element in a direction opposite to said one direction, first and second electrical contacts spaced on opposite sides of said element, and contact means on said element spaced from both said first and said second electrical contacts when both of said heater winding means are deenergized and alternatively engageable with said first and second electrical contacts.

7. A thermally responsive device comprising an element at least a part of which is bendable in response to applied heat, first heater winding means disposed in heat transfer relation to said element and energizable to deflect a portion of said element in one direction, second heater winding means disposed in heat transfer relation to said element and energizable to deflect said portion of said element in a direction opposite to said one direction, first and second electrical contacts spaced on opposite sides of said element, contact means on said element alternatively engageable with said first and second electrical contacts, and means for alternatively energizing said heater winding means.

8. A thermally responsive device comprising first and second elongated polymetallic thermally bendable portions, means fixing one end of said first portion, means interjoining the other end of said first portion and one end of said second portion, heater means in heat transfer relation with said first portion for bending said first portion to tend to move the other end of said second portion in one direction, heater means in heat transfer relation with said second portion for bending said second portion to tend to move said other end of said second portion in a direction opposite to said one direction, first and second electrical contacts spaced on opposite sides of said second portion, and contact means on said other end of said second portion spaced from said first and second electrical contacts when both of said heater means are deenergized and alternatively engageable with said first and second electrical contacts.

9. A thermally responsive device comprising an element at least a part of which is bendable in response to applied heat, first heater winding means disposed in heat transfer relation to said element and energizable to deflect a portion of said element in one direction, second heater winding means disposed in heat transfer relation to said element and energizable to deflect said portion of said element in a direction opposite to said one direction, first and second electrical contacts spaced from said element, and contact means on said element spaced from both said first and second electrical contacts when both of said heater winding means are deenergized and engageable with said first electrical contact when said portion of said element is deflected in said one direction and engageable with said second contact when said portion of said element is deflected in said opposite direction.

10. A thermally responsive device comprising first and second elongated polymetallic thermally bendable portions, means fixing one end of said first portion, means interjoining the other end of said first portion and one end of said second portion, heater means in heat transfer relation with said first portion for bending said first portion to tend to move the other end of said second portion in one direction, heater means in heat transfer relation with said second portion for bending said second portion to tend to move said other end of said second portion in a direction opposite to said one direction, first and second electrical contacts spaced from said other end of said second portion, and contact means on said other end of said second portion spaced from both said first and second electrical contacts when both said heater means are deenergized and engageable with said first electrical contact when said other end of said second portion is deflected in said one direction and engageable with said second electrical contact when said other end of said second portion is deflected in said opposite direction.

11. A thermally responsive device comprising first and second elongated polymetallic thermally bendable portions, means fixing one end of said first portion, means interjoining the other end of said first portion and one end of said second portion, heater means in heat transfer relation with said first portion for bending said first portion to tend to move the other end of said second portion in one direction, heater means in heat transfer relation with said second portion for bending said second portion to tend to move said other end of said second portion in a direction opposite to said one direction, first and second electrical contacts spaced from said other end of said second portion, contact means on said other end of said second portion spaced from both said first and said second electrical contacts when both said heater means are deenergized and engageable with said first electrical contact when said other end of said second portion is deflected in said one direction and engageable with said second electrical contact when said other end of said second portion is deflected in said opposite direction, and means for alternatively energizing said heater means.

12. A thermally responsive device comprising first and second elongated polymetallic thermally deflectable portions, means fixing one end of said first portion, means interjoining the other end of said first portion and one end of said second portion, first heater means in heat transfer relation with said first portion for deflecting said first portion to move the other end of said second portion in one direction, second heater means in heat transfer relation with said second portion for deflecting said other end of said second portion in a direction opposite to said one direction, a pair of electrical contacts controlled by said second portion, means independent of said electrical contacts for controlling the energization of said first and second heater means, and third heater means in heat transfer relation with said second portion and controlled by said electrical contacts.

13. A thermally responsive device comprising first and second elongated polymetallic thermally deflectable portions, means fixing one end of said first portion, means interjoining the other end of said first portion and one end of said second portion, first heater means in heat transfer relation with said first portion for deflecting said first portion to move the other end of said second portion in one direction, second heater means in heat transfer relation with said second portion for deflecting said other end of said second portion in a direction opposite to said one direction, third heater means in heat transfer relation with said second portion, and means including said second portion for controlling the energization of said third heater means.

References Cited in the file of this patent

UNITED STATES PATENTS

| | | |
|---|---|---|
| 1,910,721 | Taylor et al. | May 23, 1933 |
| 2,171,895 | Sardeson | Sept. 5, 1939 |
| 2,293,671 | Alexander | Aug. 16, 1942 |
| 2,338,474 | Wilson | Jan. 4, 1944 |
| 2,502,180 | Smulski | Mar. 28, 1950 |
| 2,654,865 | Klug | Oct. 6, 1953 |
| 2,655,859 | Bell | Oct. 20, 1953 |
| 2,769,890 | Hallerberg et al. | Nov. 6, 1956 |
| 2,978,861 | Smulski | Apr. 11, 1961 |